US011718216B2

(12) United States Patent
Shah (10) Patent No.: US 11,718,216 B2
(45) Date of Patent: Aug. 8, 2023

(54) CABIN CONTROL VALVE INTEGRATED WITH SOLENOID VALVE

(71) Applicant: Rotex India PVT LTD., Gujarat (IN)

(72) Inventor: Nirav Shah, Gujarat (IN)

(73) Assignee: ROTEX AUTOMATION LTD., Gujarat (IN)

(*) Notice: Subject to any disclaimer, the term of this patent is extended or adjusted under 35 U.S.C. 154(b) by 330 days.

(21) Appl. No.: 16/992,334

(22) Filed: Aug. 13, 2020

(65) Prior Publication Data

US 2021/0046857 A1 Feb. 18, 2021

(30) Foreign Application Priority Data

Aug. 13, 2019 (IN) .............................. 201921032814

(51) Int. Cl.
*B60P 1/16* (2006.01)
*F15B 13/02* (2006.01)
*B60P 1/04* (2006.01)

(52) U.S. Cl.
CPC ............... *B60P 1/162* (2013.01); *B60P 1/045* (2013.01); *F15B 13/02* (2013.01)

(58) Field of Classification Search
CPC ............ B60P 1/162; B60P 1/045; F15B 13/02
See application file for complete search history.

(56) References Cited

U.S. PATENT DOCUMENTS

| | | | | | |
|---|---|---|---|---|---|
| 3,415,169 | A | * | 12/1968 | Manuel | F15B 15/16 91/405 |
| 3,464,755 | A | * | 9/1969 | Brown | B60P 1/045 180/282 |
| 3,670,274 | A | * | 6/1972 | Ellison | F16K 31/0627 335/278 |
| 3,921,128 | A | * | 11/1975 | Snead | B60R 16/0233 340/440 |
| 3,921,670 | A | * | 11/1975 | Clippard, Jr. | F16K 31/0606 137/625.65 |
| 3,937,242 | A | * | 2/1976 | Eckert | G05D 16/2095 137/596.2 |
| 4,076,045 | A | * | 2/1978 | Nakajima | F16K 31/0606 251/129.21 |
| 4,196,751 | A | * | 4/1980 | Fischer | F16K 31/0627 137/625.65 |
| 4,501,299 | A | * | 2/1985 | Klimowicz | F16K 31/0627 137/625.5 |
| 4,848,727 | A | * | 7/1989 | Nanbu | F16K 31/0658 137/625.65 |

(Continued)

*Primary Examiner* — Craig M Schneider
*Assistant Examiner* — Christopher D Ballman
(74) *Attorney, Agent, or Firm* — Greer Burns & Crain Ltd.

(57) ABSTRACT

A cabin control valve assembly for a vehicle includes a cabin control valve with at least one port P, and at least one solenoid direction control valve that is integrated with the cabin control valve at the at least one port P such that pressurised air that enters through an inlet port of the cabin control valve reaches an inlet of the at least one solenoid direction control valve. The at least one solenoid direction control valve is configured to allow, based on at least one signal indicative of at least one parameter related to the vehicle, delivery of pressurised air to a corresponding cylinder coupled to the cabin control valve assembly for operation of the cylinder.

9 Claims, 10 Drawing Sheets

(56) References Cited

U.S. PATENT DOCUMENTS

| | | | | |
|---|---|---|---|---|
| 4,988,974 | A * | 1/1991 | Fury | B60P 1/045 340/673 |
| 5,687,981 | A * | 11/1997 | George | B60P 1/045 414/469 |
| 5,742,228 | A * | 4/1998 | Levy | B60P 1/045 298/22 C |
| 6,175,788 | B1 * | 1/2001 | Hasegawa | B60G 17/0185 701/33.9 |
| 7,810,887 | B2 * | 10/2010 | Hjerth | B60P 1/16 340/440 |
| 9,663,012 | B2 * | 5/2017 | Vitale | B60P 1/28 |
| 9,764,671 | B2 * | 9/2017 | Vacca | F16K 15/18 |
| 9,937,844 | B2 * | 4/2018 | Cronholm | B60P 1/162 |
| 9,952,115 | B2 * | 4/2018 | Landes | G01M 17/007 |
| 10,465,816 | B2 * | 11/2019 | Maruyama | F16K 31/0641 |
| 2002/0153204 | A1 * | 10/2002 | Veletovac | B66B 9/04 187/285 |
| 2011/0010040 | A1 * | 1/2011 | Ichinose | B60P 1/045 701/31.4 |
| 2011/0278488 | A1 * | 11/2011 | Feser | F16K 31/1221 251/324 |
| 2012/0209502 | A1 * | 8/2012 | Nichols | B62D 53/021 701/124 |
| 2016/0264032 | A1 * | 9/2016 | Terada | G07C 5/0808 |

* cited by examiner

CABIN CONTROL VALVE INTEGRATED WITH SOLENOID VALVE

FIELD OF INVENTION

The present invention relates to a cabin control valve for controlling hydraulic power tool. The present invention more particularly relates to a cabin control valve integrated with solenoid valve.

BACKGROUND OF INVENTION

Heavy power devices which output great work or are capable of moving heavy objects are commonly used in for example construction sites or steel workshops. Examples of the heavy power devices are rear-dump trucks and hydraulic crane tracks. To obtain a great power output, most of the heavy power devices are operated hydraulically. A hydraulic power system requires a pump to pressurize the hydraulic fluid and thus supply the high-pressure hydraulic fluid that is needed in operating the hydraulic power device. The pump may be driven by means of an electrical motor or an engine. The pump has to be turned on before the hydraulic power device is operated or the pump has to maintain continuous operation in order to supply the high-pressure hydraulic fluid. The pump has to be stopped once the supply of high-pressure hydraulic fluid is no longer needed and this may be done by means of for example a clutch or the like coupled between the pump and the motor/engine.

A regular hydraulically operated device, a controller is provided for the operator to control the supply of the high-pressure hydraulic fluid and the moving direction of the hydraulic device. Such a controller may be electrically or pneumatically operated. For certain hydraulic power devices, pneumatic power is more readily available for control purpose, such as a rear-dump truck which itself is equipped with an air compressor or similar device. In such a case, a pneumatic control assembly like cabin control valve used for controlling the hydraulic valve controlling the hydraulic cylinders in turn.

With conventional Cabin Control valve, driver of such truck is able to move the tipper up, down or hold in a particular position. Also, it is able to control the latching of the hydraulic pump with engine with a PTO (power take off) switch provided on Cabin control valve. Majorly all such Cabin Control valves are mechanical valve i.e. those need to operate by hand by driver as per need.

During the operation of tipping it is recommended not to start the operation of tipping if the vehicle is not on a flat and stable surface. In cases where truck is not standing on a flat area and it has a tilt more than +/−5 degrees then there are cases found where in such uneven surface when dumper or tipper is moved up the truck loses its grip and imbalances due to centre of gravity shifting up and results into many accidents of truck overturning. To avoid this, solenoid valve is put at the outlet of the "UP" Port of the cabin control valve. Here this port is pressurized with air when the driver moves the joystick of the cabin control valve in upward direction. In general condition this is directly connected to hydraulic valve which in turn supplies hydraulic pressure from hydraulic pump to hydraulic cylinder to move the tipper up but to add safety this additional solenoid valve is added in the circuit. Now this solenoid valve will be energized only when level sensor informs the ECU that truck is station on the flat land and conditions are right for tipping operation and thus ensuring safety. As now tipper will not move up unless trucks is on the surface having title within +/−5 degree.

Existing construction of cabin control valve includes cabin control valve wherein, 3/2 solenoid valve is connected through a pipe and attached with cabin control valve. Due to this sort of construction we have additional components adding up like pipes, fitting and mounting accessories for solenoid valve etc. These add into cost and also into failure modes. Also, drivers can tamper the system by bypassing the solenoid valve.

The present invention solves above problem by connecting solenoid valve directly said integrated to the cabin control valve for required application such as PTO [Power Take-off], Tipping, Downing operation, etc. Also, it covers all the possible requirement which may come in future for integrating solenoid valves of various types at various places through a modular concept. Example a human detection sensor can be place below tipper which will not allow tipper to come down unless tipper bottom is clear and in such case a valve controlling the output of "Down port" can be consider. Likewise, solenoid valve can be incorporated at inlet position which will control the air supply such as vehicle in the safe operable condition or supply can be cut off if air supply is insufficient And many other possibilities. Applicant faces a major problem is that users operate CCV for tipping or downing operation when truck is parked on slant surface which may damage vehicle or pneumatic/hydraulic system also. To solve problems applicant has invented cabin control valve which is integrated with solenoid direction control valve and attached with sensor.

SUMMARY OF THE INVENTION

The principal object of the present invention is to provide cabin control valve which is integrated with solenoid direction control valve wherein solenoid valve consisting of 3/2 solenoid valve, 5/2 solenoid valve, 4/2 solenoid valve, 2/2 solenoid valve, etc. Moreover, the present invention provides a cabin control valve which is integrated with 3/2 solenoid valve wherein solenoid direction control valve allows to enter pressurised air into cabin control valve and discharged previous air from cabin control valve.

One of the objects of the present invention is to provide cabin control valve wherein solenoid direction control valve which is connected at least one of the ports provided on to cabin control valve.

One of the objects of the present invention is to provide more than one ports such as PTO port, Up port, Down port, etc. as per requirements of the operations on which solenoid direction control valve is integrated.

One of the objects of the present invention is to provide a cabin control valve integrated with solenoid direction control valve and operated by said cabin control valve.

One of the objects of the present invention is to provide a cabin control valve wherein more than one solenoid direction control valve may integrate with the ports of said cabin control valve.

Another object of the present invention is to provide a cabin control valve wherein sensor detects position of loading platform as loading platform is at downward position or upward position and compare position of loading platform with parking position of vehicle as vehicle is parked at on slope or flat surface. If the vehicle is parked on slop surface then sensor prevents tipping operation.

One of the objects of the present invention is to provide a simple pneumatic or hydraulic circuit for operation of the cabin control valve.

One of the objects of the present invention is to provide efficiently cabin control valve system.

One of the objects of the present invention is to provide a cabin control valve integrated with solenoid valve which is easy to operate for untrained users.

BRIEF DESCRIPTION OF THE DRAWINGS

The objects, features and advantages of the invention will best be understood from the following description of various embodiments thereof, selected for purposes of illustration, and shown in the accompanying figures.

DETAIL DESCRIPTION OF THE INVENTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present invention solves existing problems by providing solenoid valve directly said integrated to the cabin control valve for required application such as PTO [Power Take-off], Tipping, Downing operation.

The principal embodiment of the present invention is to provide cabin control valve which is integrated with solenoid valve wherein solenoid valve consisting of 3/2 solenoid valve, 5/2 solenoid valve, 4/2 solenoid valve, 2/2 solenoid valve, etc. More than one solenoid direction control valve is configured partially within cabin control valve. The word "Partially" is disclosed herein as the solenoid direction control valve is integrated with cabin control valve.

One of the embodiments of the present invention is to provide cabin control valve wherein solenoid valve is connected at least one of the ports provided on to cabin control valve.

One of the embodiments of the present invention is to provide more than one ports such as PTO port, Up port, Down port, etc. as per requirements of the operations.

One of the embodiments of the present invention is to provide a cabin control valve integrated with solenoid valve and operated by said solenoid valve.

One of the embodiments of the present invention is to provide a cabin control valve wherein more than one solenoid valve may integrate with said cabin control valve.

One of the embodiments of the present invention is to provide a simple pneumatic or hydraulic circuit for operation of the cabin control valve.

One of the embodiments of the present invention is to provide efficiently cabin control valve system.

One of the embodiments of the present invention is to provide a cabin control valve integrated with solenoid valve which is easy to operate for untrained users.

Another embodiment of the present invention is to provide a cabin control valve wherein sensor is connected with cabin control valve which detects position of loading platform like loading platform is at downward position or upward position and compare position of loading platform with parking position of vehicle as vehicle is parked at on slope or flat surface. Moreover, if vehicle is at slope and driver gives command for upward position to loading platform then sensor does not proceed driver's command as a vehicle is on slop.

The present invention does not limit its scope by providing only 3/2 solenoid valve, it can be 5/2 solenoid valve, 4/2 solenoid valve, 2/2 solenoid valve, etc. Moreover, the present invention provides a cabin control valve integrated with solenoid valve which is for pneumatic system and also for hydraulic system.

Figure 1:
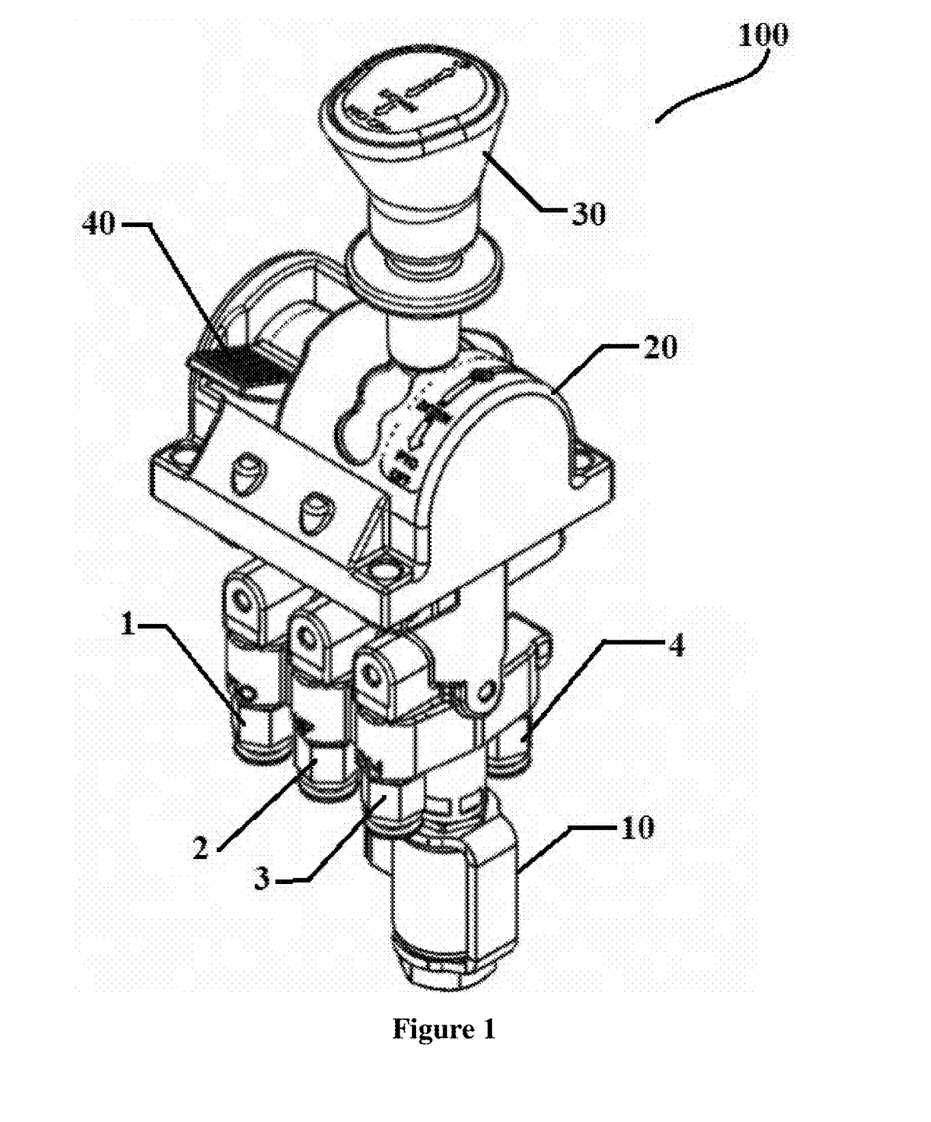
FIG. 1. illustrates a cabin control valve assembly that is integrated with 3/2 solenoid valve.

FIG. 1 of the present invention illustrate cabin control valve assembly 100 that comprises a cabin control valve 20 and a 3/2 solenoid valve 10 integrated with the cabin control valve 20, wherein lever 30 allows user to select the operation that are Neutral, PTO off, Up and Down by changing the position of said lever 30. Lever 30 is arranged on cabin control valve 20. Cabin control valve consisting of more than one ports for different operation such as for neutral condition, to PTO ON or OFF 1, to up the cylinder of said tipping 2, to down the cylinder of said lowering 3, inlet port 04 for air, etc. as per requirement. There are other ports said P1, P2, P3 . . . Pn are the ports located on to cabin control valve 20 on which solenoid direction control valve 10 can be attached. Solenoid direction control valve can be 3/2, 5/2, 4/2 solenoid valve. Push button 40 is for engage or disengage the PTO. Up position of the push button 40 engages the hydraulic pump with engine RPM through clutch and down position disengage the same.

Figure 2:
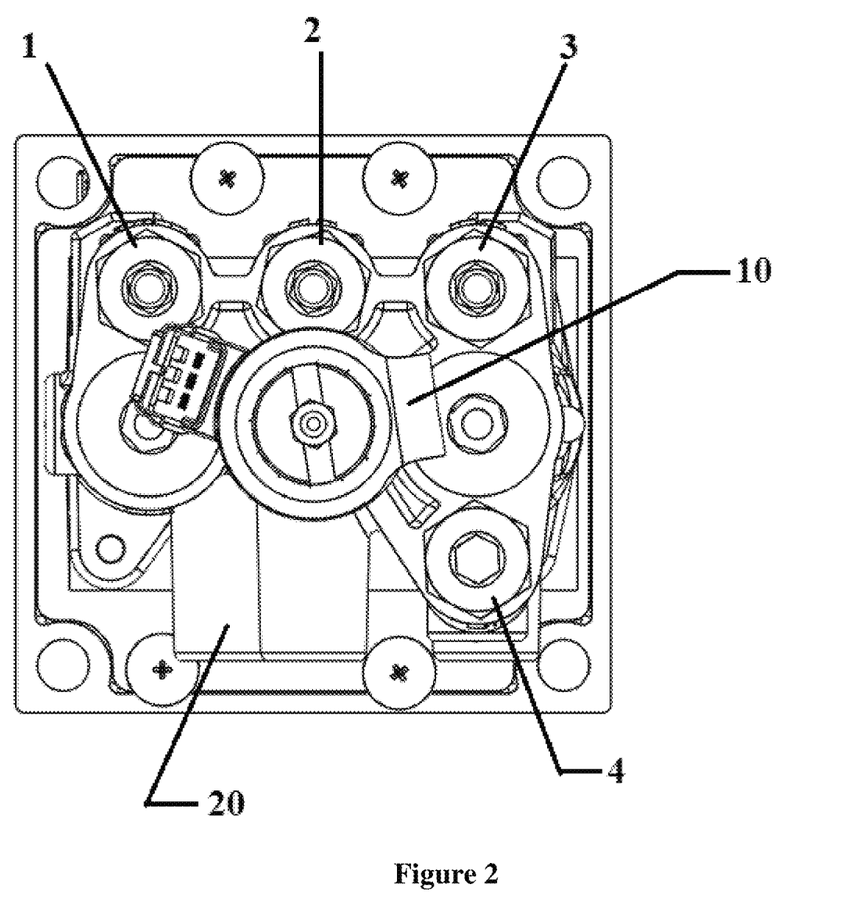
FIG. 2. discloses ports available on cabin control valve.

FIG. 2 of the present invention discloses ports available on cabin control valve 20 wherein more than one ports P for different operation such as for normal condition, to PTO 1, to up cylinder said tipping 2, to down cylinder said lowering 3, inlet port 04 for air, etc as per requirement. P1, P2, P3 . . . Pn are the ports located on to cabin control valve 20 on which solenoid direction control valve 10 can be attached.

Figure 3:
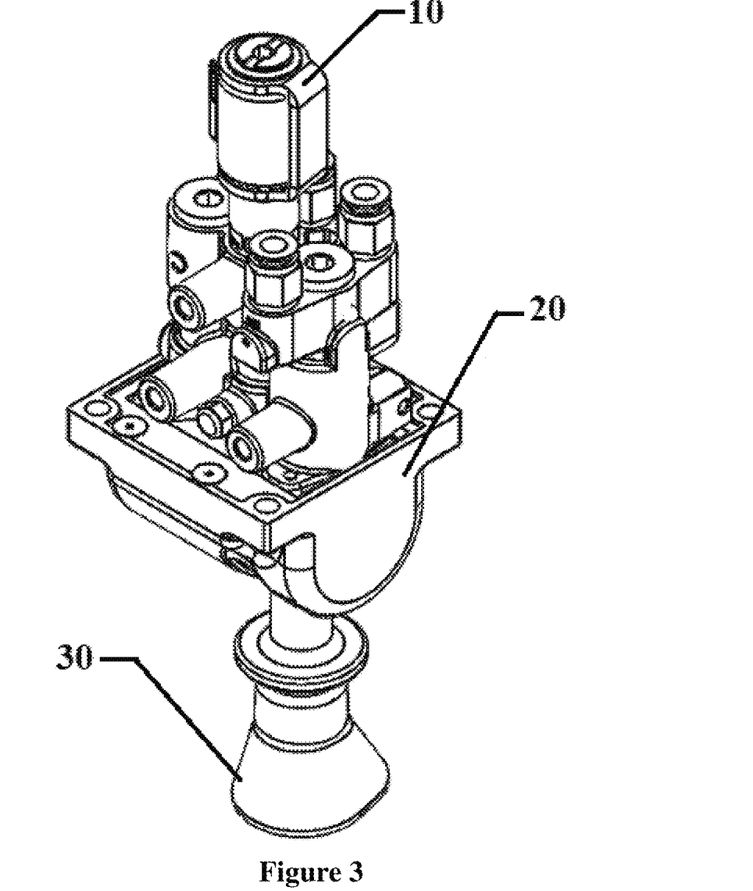
FIG. 3. discloses perspective view of cabin control valve from bottom that is integrated with 3/2 solenoid valve.

FIG. 3 of the present invention discloses perspective view of cabin control valve integrated with 3/2 solenoid valve 10 from bottom wherein 3/2 solenoid valve 10 integrated at any ports P available on to cabin control valve 20. The present invention does not limit its scope by integrating only 3/2 solenoid valve but it can be 5/2, 4/2, etc as per application.

Figure 4:
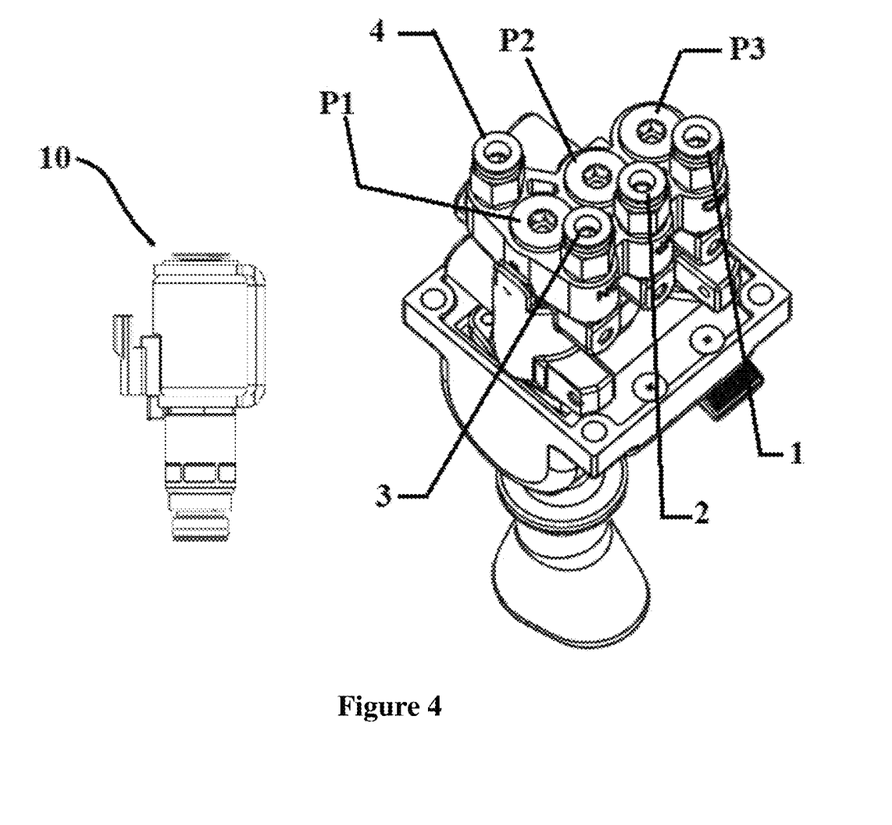
FIG. 4. discloses 3/2 solenoid valve and ports available on cabin control valve.

FIG. 4 of the present invention discloses 3/2 solenoid valve 10 and ports P available on cabin control valve wherein Ports P1, P2 and P3 is used to integrate 3/2 solenoid valve 10 into it. 3/2 solenoid valve 10 is integrated at least one of said ports P1, P2 and P3. Ports 1, 2, 3 and 4 are for different operation such as PTO, Tipping and lowering. Moreover, said cabin control valve 20 comprises ports P which consist of more than one ports i.e. P1, P2, P3 . . . Pn=P. value of no. of ports can be varied as per requirement. Said ports P used to integrate only solenoid direction control valve.

Figure 5:
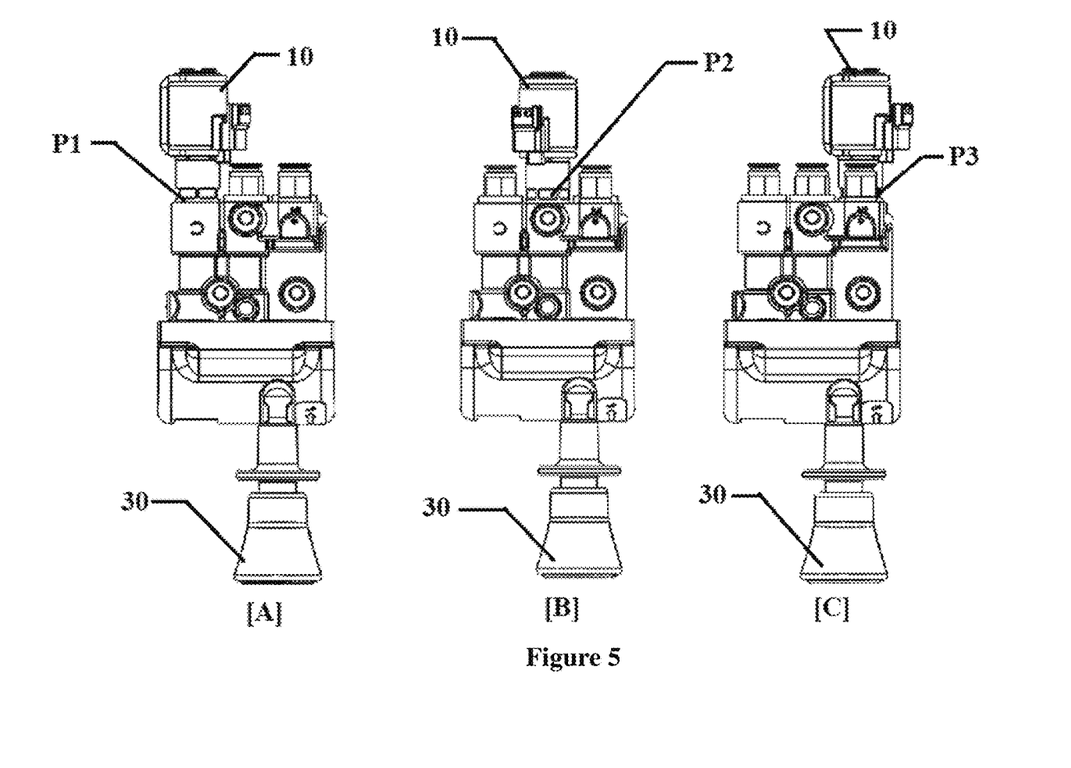
FIG. 5. discloses 3/2 solenoid valve integrated with cabin control valve for particular operation.

FIG. 5 of the present invention discloses 3/2 solenoid valve 10 integrated with cabin control valve 20 for particular operation, wherein 3/2 solenoid valve is connected at least one port P of cabin control valve 20 as per requirement. Examples are shown in FIG. 5 wherein 3/2 solenoid valve 10 may be connected to port P1 for PTO; 3/2 solenoid valve 10 may be connected to port P2 for tipping or said solenoid valve may be connected with port P3 for lowering operation. 3/2 solenoid valve 10 is connected to any port P [P1, P2, P3 . . . Pn] as per different operations such as PTO, tipping, lowering, etc.

Figure 6:
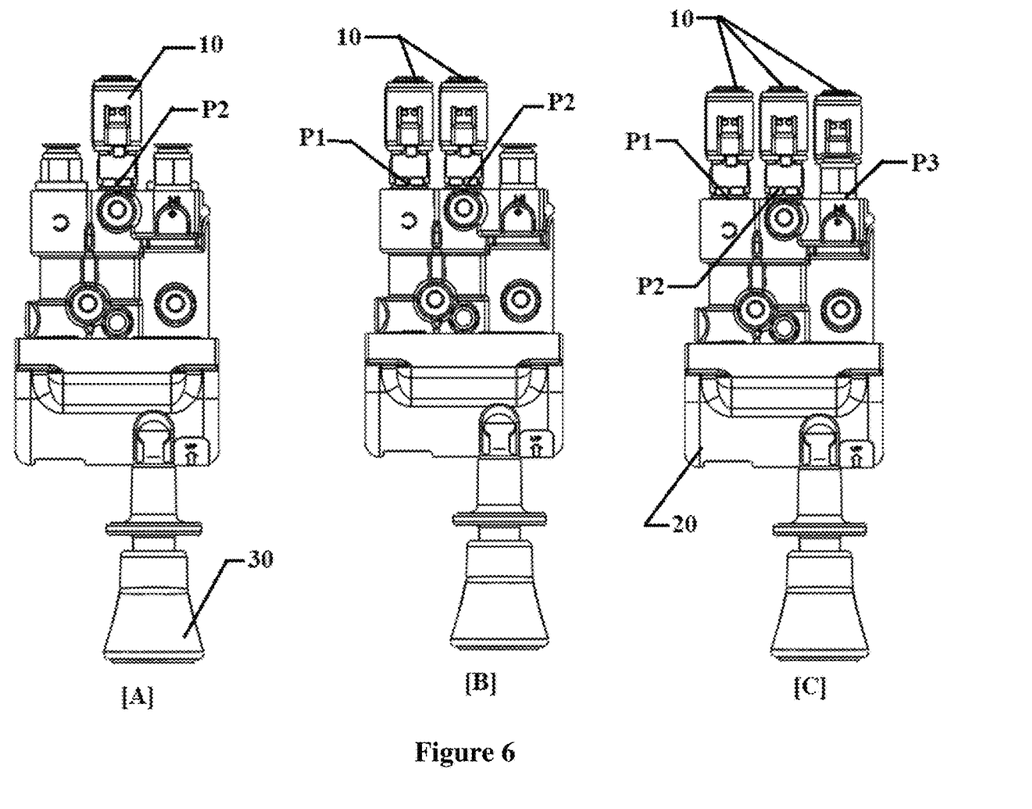
FIG. 6. discloses 3/2 solenoid valve integrated with cabin control valve for more than one operation.

FIG. 6 of the present invention discloses 3/2 solenoid valve 10 integrated with cabin control valve 20 wherein more than one 3/2 solenoid valves 10 can be connected to the ports P provided on the cabin control valve 20 for different operations. FIG. 6A discloses one cabin control valve 10 is connected to the one port P2 of the cabin control valve 20; same as FIG. 6B shows two 3/2 solenoid valves 10 are connected to the ports P said P1 and P2 of the cabin control valve 20. And FIG. 6C shows three 3/2 solenoid valves 10 are connected to the ports P said P1, P2 and P3 of the cabin control valve 20. Further, an embodiment of the present invention is to provide a cabin control valve 20 wherein multiple solenoid direction control valve can be attached to all ports or some of the ports as per requirements.

Figure 7:
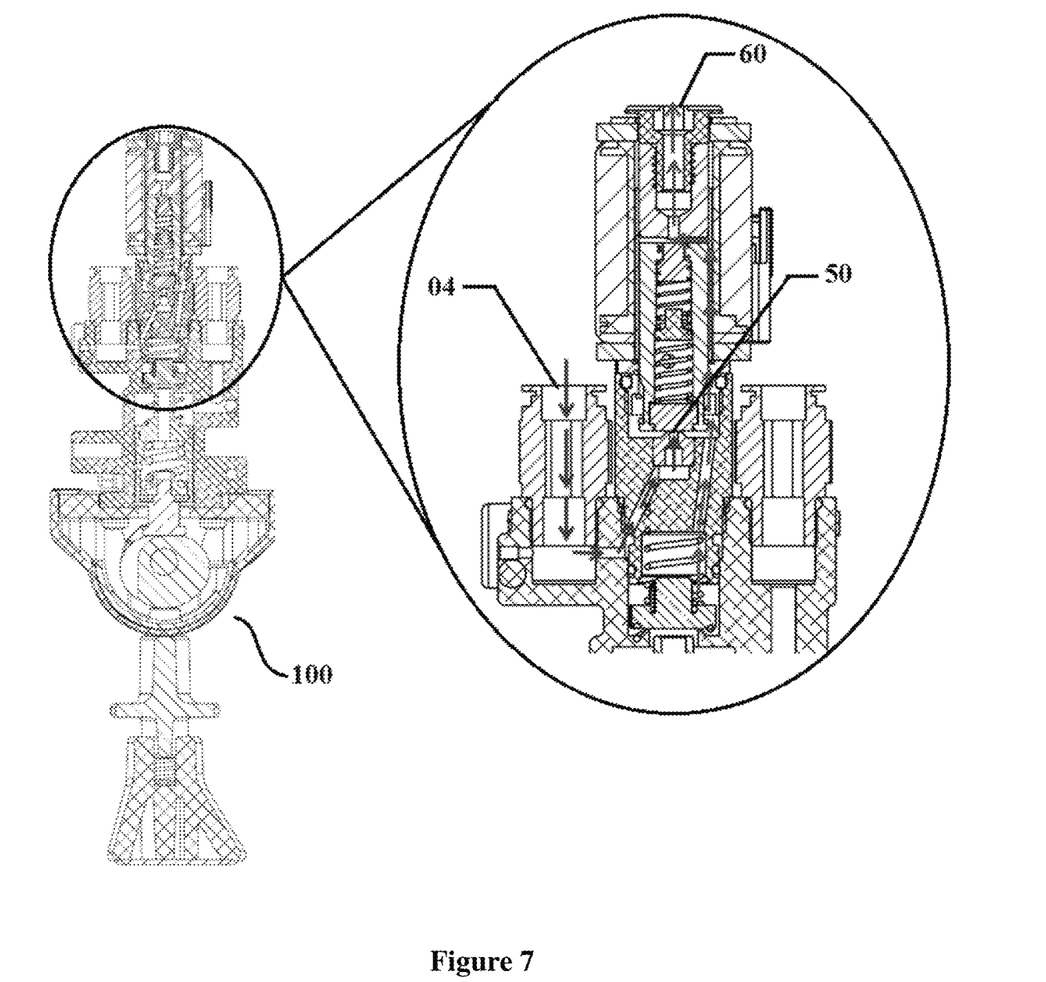
FIG. 7. discloses de-energised condition of 3/2 solenoid valve integrated with cabin control valve.

FIG. 7 of the present invention discloses de-energised condition of 3/2 solenoid valve 10 integrated with cabin control valve 20 wherein air enters into 3/2 solenoid valve 10 through inlet 50 of the solenoid valve 10. At the time of de-energised condition, the 3/2 solenoid valve 10 prevents entry of air into cabin control valve 20. At the same time, the previous pressurised air from the cabin control valve 20 escape to the atmosphere from exhaust port 60 of 3/2 solenoid valve 10.

Figure 8:
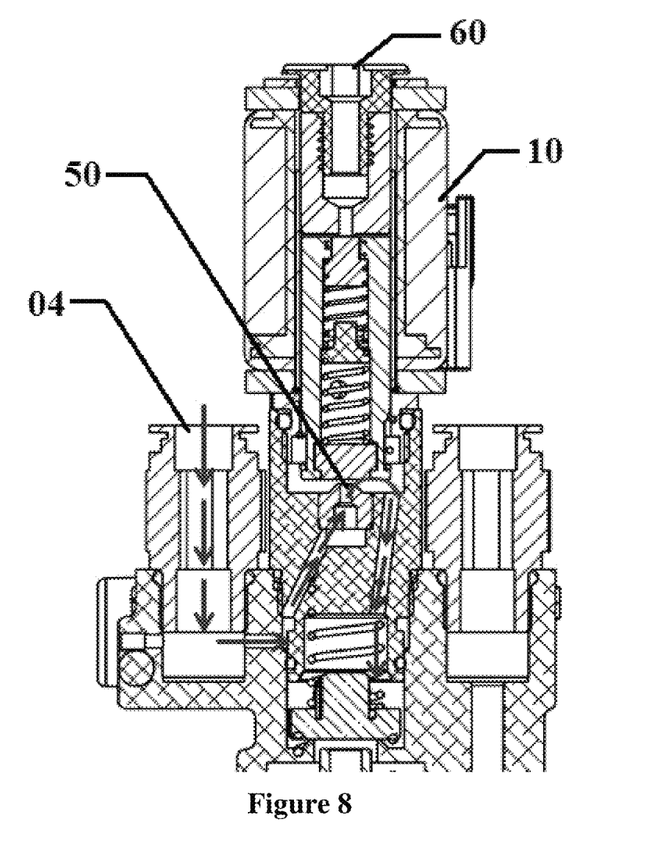
FIG. 8. discloses energised condition of 3/2 solenoid valve integrated with cabin control valve.

FIG. 8 of the present invention discloses energised condition of 3/2 solenoid valve integrated with cabin control valve 20 wherein air enters into cabin control valve 20 via 3/2 solenoid valve 10 from the inlet 50 to operate cabin control valve. During energised period exhaust port 60 remains close.

Figure 9:
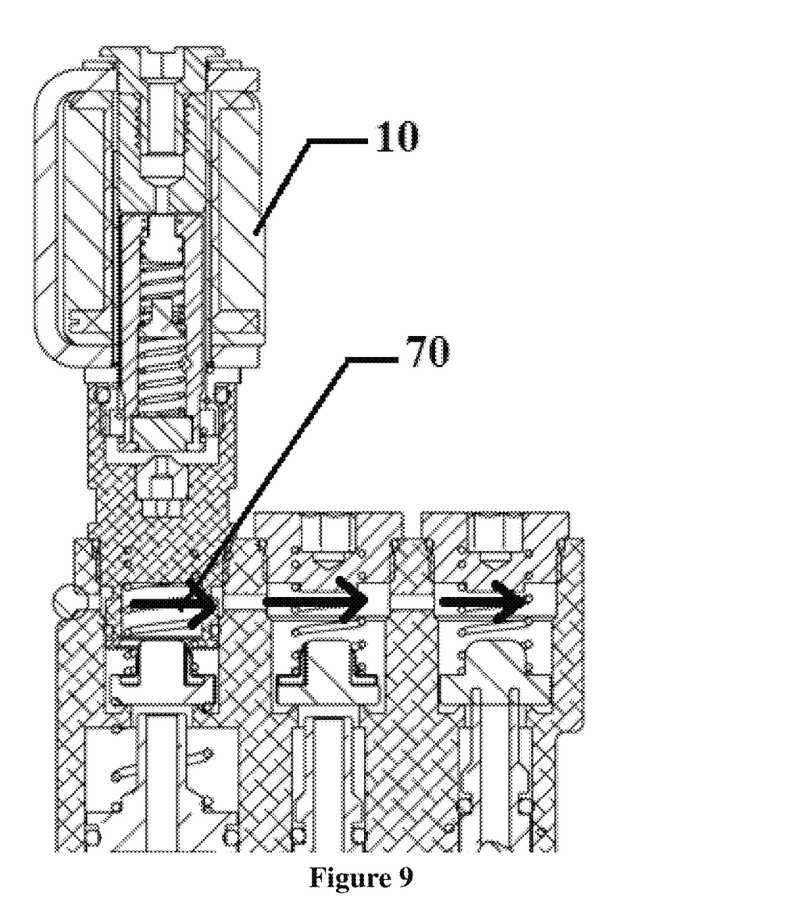
FIG. 9. discloses 3/2 solenoid valve integrated with cabin control valve allows air to enter into all cylinders.

FIG. 9 of the present invention disclose 3/2 solenoid valve 10 integrated with cabin control valve 20 allows pressurised air to enter into all cylinders so user can operate the lever and control the cabin control valve 20 as per requirement.

Figure 10:
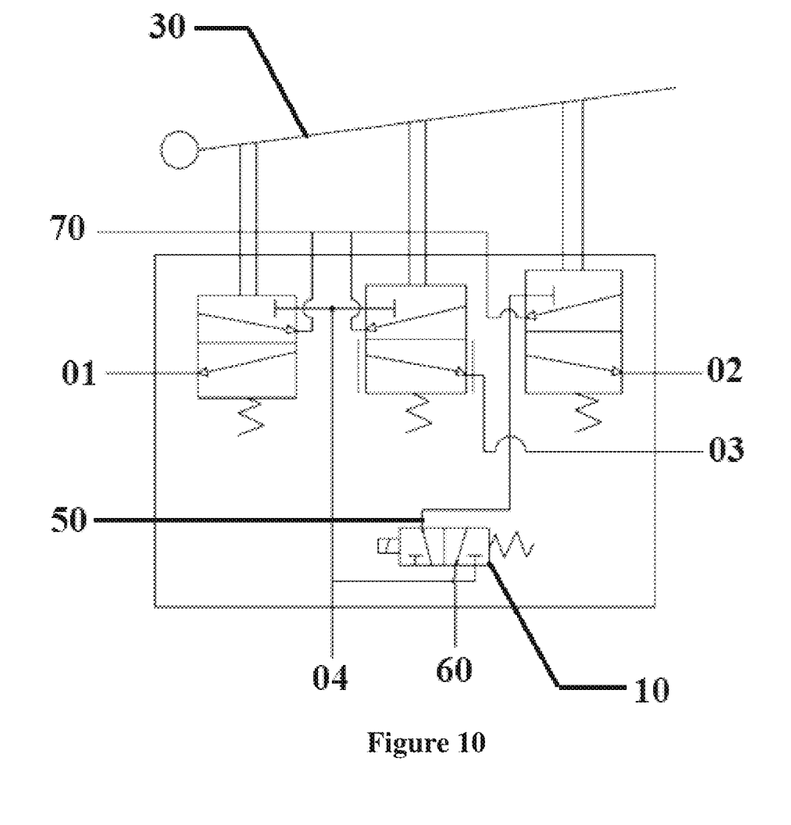
FIG. 10. discloses pneumatic circuit diagram of the cabin control valve integrated with solenoid direction control valve.

FIG. 10 of the present invention discloses a pneumatic circuit diagram of the cabin control valve assembly 100 that integrates a 3/2 solenoid valve 10 wherein cabin control valve 2011301 exhaust port 70 of cabin control valve 20, PTO port 01, tipping port 02, lowering port 03, inlet port 04 of the cabin control valve 20, inlet 50 of 3/2 solenoid valve 10, exhaust port 60 of solenoid valve 10 and 3/2 solenoid valve 10. An embodiment of the present invention is to provide solenoid direction control valve which is integrated with cabin control valve wherein pressurised air enters into cabin control valve 20 from inlet port 04 of the cabin control valve 20 to which inlet 50 of the 3/2 solenoid valve 10 is connected. Pressurised air enters into solenoid valve by means of inlet 50. Further, position of lever 30 varies as per required operation. For an example, if the position of level 30 is at tipping operation then pressurised air enters from inlet port 04 of the cabin control valve and reaches solenoid valve. The solenoid valve 10 integrated at port P2 shall allow said pressurised air to the port 02 for tipping operation and allows to discharge previous pressurised air via exhaust port 60. Same way for different operation 3/2 solenoid valve will be integrated to ports P of the cabin control valve.

We claim:

1. A cabin control valve assembly (100) for a vehicle, comprising:
a cabin control valve (20) having at least one port P;
at least one solenoid direction control valve configured within the cabin control valve (20) at the at least one port P such that pressurised air that enters through an inlet port (04) of the cabin control valve (20) reaches an inlet (50) of the at least one solenoid direction control valve (10);
wherein the at least one solenoid direction control valve (10) is configured to allow, based on at least one signal indicative of at least one parameter related to the vehicle, delivery of pressurised air to a corresponding cylinder coupled to the cabin control valve assembly (100), for operation of the cylinder;
wherein, after completion of operation of the cylinder, the pressurized air from the cylinder is discharged through the solenoid direction control valve (10) from an exhaust port (60);
wherein, in a de-energised condition, the solenoid direction control valve (10) prevents delivery of the pressurised air to the cylinder and allows the pressurised air from the cylinder to escape from an exhaust port (60) of the solenoid direction control valve (10); and in an energised condition, the solenoid direction control valve (10) allows pressurised air to enter into the cylinder through the inlet (50) for operation of the cylinder.

2. The cabin control valve assembly (100) as claimed in claim 1, wherein the at least one parameter related to the vehicle comprises level of the vehicle, position of a loading platform of the vehicle and a comparison of a parking position of the vehicle with the position of the loading platform.

3. The cabin control valve assembly (100) as claimed in claim 2, wherein when the loading platform is at a downward position or an upward position, a tipping operation is allowed based on the level of the vehicle.

4. The cabin control valve assembly (100) as claimed in claim 1, wherein the at least one port P comprises a port P1, a port P2 and a port P3, and the at least one solenoid direction control valve (10) is configured with one or more of the port P1, the port P2 and the port P3.

5. The cabin control valve assembly (100) as claimed in claim 4, wherein the cabin control valve (20) comprises more than one outlet ports for being coupled to different cylinders for different operations, the more than one outlet ports comprising a PTO port (1), an Up port (2) and a Down port (3); and wherein each of the at least one solenoid direction control valve (10) corresponds to one of the outlet ports to control delivery of the pressurised air from the corresponding outlet port, and thereby to the corresponding cylinder coupled thereto.

6. The cabin control valve assembly (100) as claimed in claim 5, wherein the at least one solenoid direction control valve (10) is connected to the port P1 to control flow of the pressurised air through the down port (3) for a lowering operation.

7. The cabin control valve assembly (100) as claimed in claim 5, wherein the at least one solenoid direction control valve (10) is connected to the port P2 to control flow of the pressurised air through the Up port (2) for a tipping operation.

8. The cabin control valve assembly (100) as claimed in claim 5, wherein the at least one solenoid direction control valve (10) is connected to the down port P3 to control flow of the pressurised air through the PTO port (1) for a PTO operation.

9. The cabin control valve assembly (100) as claimed in claim 4, comprising more than one solenoid direction control valves (10) integrated with the different ports P.

* * * * *